US008179513B2

(12) United States Patent
Kurasawa

(10) Patent No.: US 8,179,513 B2
(45) Date of Patent: May 15, 2012

(54) TRANSFLECTIVE LIQUID CRYSTAL DISPLAY PANEL AND ELECTRONIC APPARATUS

(75) Inventor: Hayato Kurasawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 12/191,341

(22) Filed: Aug. 14, 2008

(65) Prior Publication Data

US 2009/0059139 A1 Mar. 5, 2009

(30) Foreign Application Priority Data

Aug. 27, 2007 (JP) ................................. 2007-219368

(51) Int. Cl.
*G02F 1/1343* (2006.01)
(52) U.S. Cl. ........................... 349/144; 349/106; 349/108
(58) Field of Classification Search .......... 349/104–106, 349/114, 108, 144
See application file for complete search history.

(56) References Cited

U.S. PATENT DOCUMENTS

| 2002/0041345 | A1* | 4/2002 | Nakamura | 349/1 |
| 2002/0041354 | A1* | 4/2002 | Noh et al. | 349/141 |
| 2005/0062909 | A1* | 3/2005 | Ikeno et al. | 349/106 |
| 2005/0162588 | A1* | 7/2005 | Narutaki et al. | 349/106 |
| 2006/0092363 | A1* | 5/2006 | Hasegawa et al. | 349/141 |
| 2006/0098144 | A1* | 5/2006 | Chang et al. | 349/114 |
| 2006/0103794 | A1* | 5/2006 | Iijima et al. | 349/114 |
| 2007/0279567 | A1* | 12/2007 | Matsushima | 349/143 |

FOREIGN PATENT DOCUMENTS

| JP | 2002-014363 | 1/2002 |
| JP | 2002-182230 | 6/2002 |
| JP | 2002-244158 | 8/2002 |
| JP | 2003-344837 | 12/2003 |
| JP | 2006-337625 | * 12/2006 |

* cited by examiner

*Primary Examiner* — Edward Glick
*Assistant Examiner* — Sang Nguyen
(74) *Attorney, Agent, or Firm* — K&L Gates LLP

(57) ABSTRACT

A transflective liquid crystal display panel includes an array substrate and a color filter substrate. The array substrate includes a plurality of scanning lines and signal lines arranged in a matrix, a lower electrode and an upper electrode in each of pixel regions surrounded by the scanning lines and the signal lines, and a reflecting plate disposed partly below each lower electrode, the lower electrode and the upper electrode in each pixel region being disposed facing each other with an insulating film therebetween, the lower electrodes being composed of a transparent conductive material, the upper electrodes each having a plurality of slits. The color filter substrate includes color filter layer segments arranged in correspondence to the pixel regions. The plurality of slits in each upper electrode have first open ends and second closed ends. Each color filter layer segment for the corresponding pixel region has a window where the color filter layer segment does not exist, the window being located at a position above the corresponding reflecting plate and facing the second closed ends of the slits.

10 Claims, 8 Drawing Sheets

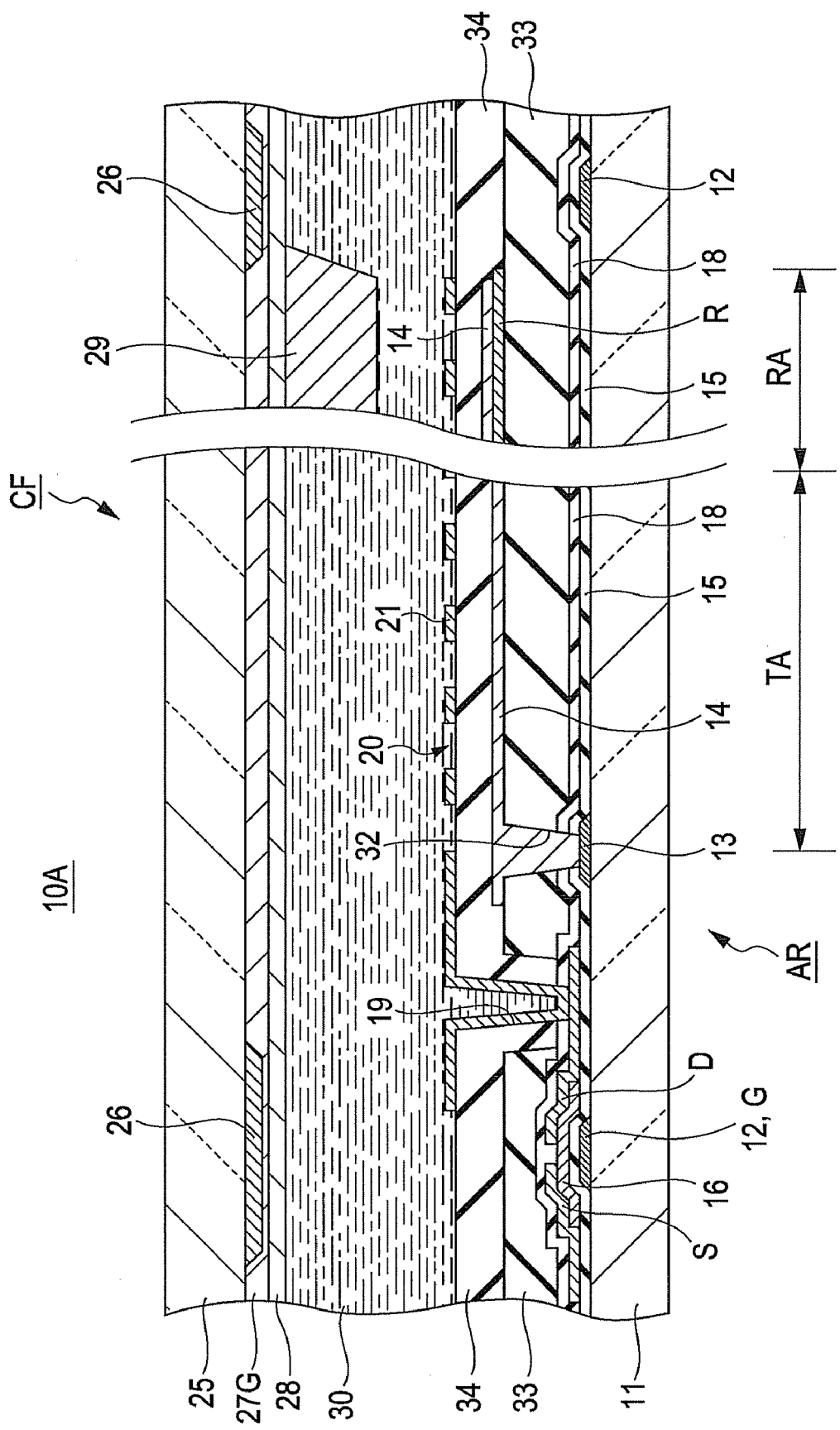

TRANSFLECTIVE LIQUID CRYSTAL DISPLAY PANEL AND ELECTRONIC APPARATUS

BACKGROUND

1. Technical Field

The present invention relates to transflective liquid crystal display panels and electronic apparatuses equipped with transflective liquid crystal display panels. In particular, the invention relates to a transflective liquid crystal display panel of a so-called fringe-field-switching (FFS) mode having a high aperture and reduced light leakage, and to an electronic apparatus equipped with such a transflective liquid crystal display panel.

2. Related Art

The development of transflective liquid crystal display panels having both transmissive and reflective properties has been advancing considerably over the recent years. A transflective liquid crystal display panel generally has a plurality of pixel regions, each having a transmissive section equipped with a pixel electrode and a reflective section equipped with both a pixel electrode and a reflecting plate. When in a dark environment, a transflective liquid crystal display panel is configured to turn on a backlight and utilize the transmissive sections to display an image. On the other hand, in a lighted environment, a transflective liquid crystal display panel does not turn on the backlight but instead utilizes external light by using the reflective sections to display an image.

The majority of liquid crystal display panels of related art are of a so-called vertical electric field mode in which a pair of substrates are each provided with electrodes, such as a twisted nematic (TN) type or a vertical alignment (VA) type, but a so-called transverse electric field mode in which electrodes are provided in only one of a pair of substrates, such as an FFS type, is also known. Examples of an FFS-mode liquid crystal display panel are disclosed in JP-A-2002-14363 and JP-A-2002-244158. An FFS-mode liquid crystal display panel is capable of achieving bright display due to having a wide viewing angle, high contrast, and high aperture.

Regarding FFS-mode liquid crystal display panels, a transflective type has been developed over the recent years, examples of which being disclosed in JP-A-2003-344837 and JP-A-2006-337625. An FFS-mode transflective liquid crystal display panel of related art will be described with reference to FIGS. 7 and 8. It should be noted that the layers and components in the drawings attached to this specification are shown with different scales from the original scales such that they are shown with dimensions recognizable to the viewer. This means that the layers and components in the drawings are not necessarily shown in proportion to their actual dimensions.

FIG. 7 is a plan view illustrating one of a plurality of pixels included in an FFS-mode transflective liquid crystal display panel of related art. FIG. 8 is a schematic cross-sectional view taken along line VIII-VIII in FIG. 7.

An FFS-mode transflective liquid crystal display panel 50 includes an array substrate AR and a color filter substrate CF. The array substrate AR includes a first transparent substrate 51, a plurality of scanning lines 52 and common wire lines 53 arranged parallel to each other on the first transparent substrate 51, and a plurality of signal lines 54 arranged crosswise to the scanning lines 52 and the common wire lines 53 on the first transparent substrate 51. The scanning lines 52 and the common wire lines 53 have their surfaces covered with a gate insulating film 55, whereas the signal lines 54 are disposed on the gate insulating film 55. The gate insulating film 55 has semiconductor layers 56 disposed thereon in areas corresponding to gate electrodes G of the scanning lines 52. A source electrode S and a drain electrode D extending from each of the signal lines 54 are partially stacked on each semiconductor layer 56. The gate electrode G, the source electrode S, and the drain electrode D in each pixel region constitute a thin film transistor (TFT). The entire surface of the first transparent substrate 51 is covered with a protective insulating film 57.

The protective insulating film 57 is covered with an interlayer film 58. In the reflective section RA of each pixel region, the interlayer film 58 has an uneven surface (not shown). In contrast, in other areas of the pixel region, the interlayer film 58 has a flat surface. In the reflective section RA of each pixel region, the interlayer film 58 has disposed thereon a reflecting plate 60 composed of aluminum or an aluminum alloy. Furthermore, the reflecting plate 60 and the interlayer film 58 in each pixel region have disposed thereon a lower electrode 61 composed of a transparent conductive material such as indium tin oxide (ITO) or indium zinc oxide (IZO). The lower electrode 61 is electrically connected to the corresponding common wire line 53 via a contact hole 62 formed in the protective insulating film 57 and gate insulating film 55 disposed on the common wire line 53. In each pixel region, the interlayer film 58 and the protective insulating film 57 have a contact hole 63 at a position corresponding to the drain electrode D, such that the drain electrode D is exposed through the contact hole 63. Of the total area occupied by the lower electrode 61 in each pixel region, the area occupied by the reflecting plate 60 defines the reflective section RA and the area not occupied by the reflecting plate 60 defines the transmissive section TA.

Each lower electrode 61 and the interlayer film 58 are covered with a capacitor insulating film 64 composed of, for example, silicon nitride or silicon oxide. The capacitor insulating film 64 covers the wall surface of each contact hole 63 in such a manner that the corresponding drain electrode D is exposed through the contact hole 63. In each pixel region, the capacitor insulating film 64 has disposed thereon an upper electrode 66 composed of a transparent conductive material such as ITO or IZO and having a plurality of parallel slits 65. The opposite ends of each slit 65 in the upper electrode 66 are closed ends. The upper electrode 66 is electrically connected to the drain electrode D via the contact hole 63. The upper electrode 66 and the slits 65 thereof are covered with an alignment film (not shown).

On the other hand, the color filter substrate CF includes a second transparent substrate 67 on which a black matrix 68, color filter layer segments 69, and an overcoating layer 70 are disposed. The overcoating layer 70 covers the black matrix 68 and the color filter layer segments 69, and moreover, the overcoating layer 70 has an alignment film (not shown) disposed thereon. The FFS-mode transflective liquid crystal display panel 50 is formed by disposing the array substrate AR and the color filter substrate CF opposite to each other in a manner such that the upper electrodes 66 of the array substrate AR and the color filter layer segments 69 of the color filter substrate CF face each other, and then sealing a liquid crystal layer 71 between the array substrate AR and the color filter substrate CF.

The transflective liquid crystal display panel 50 of the related art can perform display with an aperture higher than that in a vertical electric field mode. However, the liquid crystal display panels in recent years, particularly, compact liquid crystal display panels used in, for example, portable telephones, are becoming more and more highly defined. Therefore, a liquid crystal display panel having an even higher aperture and brightness is in great demand. In addition, in a transflective liquid crystal display panel like the one described above, a variation in color tone can sometimes occur between the display mode using the transmissive sections and the display mode using the reflective sections. For this reason, a liquid crystal display panel having reduced variation in display quality and allowing for a uniform display operation under either display mode is in demand.

SUMMARY

An advantage of some aspects of the invention is that a transflective liquid crystal display panel is provided, which has a higher aperture and brightness, prevents a variation in color tone from occurring between a display mode using transmissive sections and a display mode using reflective sections, and minimizes light leakage and cross talk so as to prevent the display quality from deteriorating, and that an electronic apparatus equipped with such a transflective liquid crystal display panel is provided.

According to an aspect of the invention, a transflective liquid crystal display panel includes an array substrate and a color filter substrate. The array substrate includes a plurality of scanning lines and signal lines arranged in a matrix, a lower electrode and an upper electrode in each of pixel regions surrounded by the scanning lines and the signal lines, and a reflecting plate disposed partly below each lower electrode, the lower electrode and the upper electrode in each pixel region being disposed facing each other with an insulating film therebetween, the lower electrodes being composed of a transparent conductive material, the upper electrodes each having a plurality of slits. The color filter substrate includes color filter layer segments arranged in correspondence to the pixel regions. The plurality of slits in each upper electrode have first open ends and second closed ends. Each color filter layer segment for the corresponding pixel region has a window where the color filter layer segment does not exist, the window being located at a position above the corresponding reflecting plate and facing the second closed ends of the slits.

Accordingly, since the first ends of the plurality of slits in each upper electrode are open ends, the electric-field generating range becomes larger, thereby allowing for a display operation with a high aperture and high brightness. Moreover, with each color filter layer segment being provided with a window, a variation in color tone between the display mode using the reflective sections having reflecting plates and the display mode using the transmissive sections can be prevented from occurring, thereby achieving uniform display quality. In addition, each of the windows is formed in an area that faces the corresponding reflecting plate and that excludes an area facing the open ends of the slits in the corresponding upper electrode. This reduces the occurrence of light leakage or cross talk caused by a transverse electric field generated near the open ends of the slits, thereby preventing the display quality from deteriorating by a significant degree. Accordingly, the above aspect of the invention provides a transflective liquid crystal display panel that has a higher aperture and brightness than the transflective liquid crystal display panel of the related art, achieves uniform color tone, and prevents the display quality from deteriorating due to, for example, light leakage.

In the transflective liquid crystal display panel according to the above aspect of the invention, it is preferable that the windows in the color filter layer segments have different areas from each other in accordance with color components of the color filter layer segments.

Accordingly, each window is given an area that is set based on the color component of the corresponding color filter layer segment. Therefore, a color filter layer segment for a color with high visibility, such as a color filter layer segment for green color, may be given a window with a large area, whereas a color filter layer segment for a color with low visibility, such as a color filter layer segment for blue color, may be given a window with a small area. In this manner, uniform color tone can be readily achieved.

In the transflective liquid crystal display panel according to the above aspect of the invention, the color filter substrate may have transparent resin layer segments for cell gap adjustment, each transparent resin layer segment being located at a position facing a corresponding one of the reflecting plates.

Accordingly, with the transparent resin layer segments, the distance at which external light is affected by liquid crystal when a display operation is performed by reflecting the external light can be made substantially the same as that in a display operation using a light source. This allows for uniform display quality.

In the transflective liquid crystal display panel according to the above aspect of the invention, it is preferable that the array substrate further include a switching element for each pixel region, and an interlayer film covering the switching elements. In this case, the reflecting plates and the lower electrodes are disposed on the interlayer film.

Accordingly, with the interlayer film, the areas to be occupied by the lower electrodes and the upper electrodes can advantageously be increased, thereby allowing for an even higher aperture.

In the transflective liquid crystal display panel according to the above aspect of the invention, it is preferable that the windows have corners, all of which are curved.

Accordingly, the curved corners of the windows prevent themselves from being a hindrance for the color filter layer segments during the panel manufacturing process, thereby preventing delamination of the color filter layer segments.

According to another aspect of the invention, an electronic apparatus is provided, which includes the above-described transflective liquid crystal display panel.

Accordingly, an electronic apparatus equipped with the transflective liquid crystal display panel having the above-described advantages can be provided. In particular, even if the electronic apparatus containing the transflective liquid crystal display panel is a compact electronic apparatus, such as a portable telephone, the transflective liquid crystal display panel is still capable of performing a display operation with high display quality.

BRIEF DESCRIPTION OF THE DRAWINGS

The invention will be described with reference to the accompanying drawings, wherein like numbers reference like elements.

FIG. 5 is a cross-sectional view of an FFS-mode transflective liquid crystal display panel according to a second embodiment of the invention and corresponds to FIG. 2.

DESCRIPTION OF EXEMPLARY EMBODIMENTS

Embodiments of the invention will now be described with reference to the drawings. In the following embodiments, a transflective liquid crystal display panel and an electronic apparatus for realizing the technical idea of the invention are directed to an FFS-mode transflective liquid crystal display panel as an example. However, the following embodiments are not intended to limit the invention to a transflective liquid crystal display panel and an electronic apparatus of such a type, and the invention can be equally applied to other embodiments included in the scope of the claims.

Figure 1:
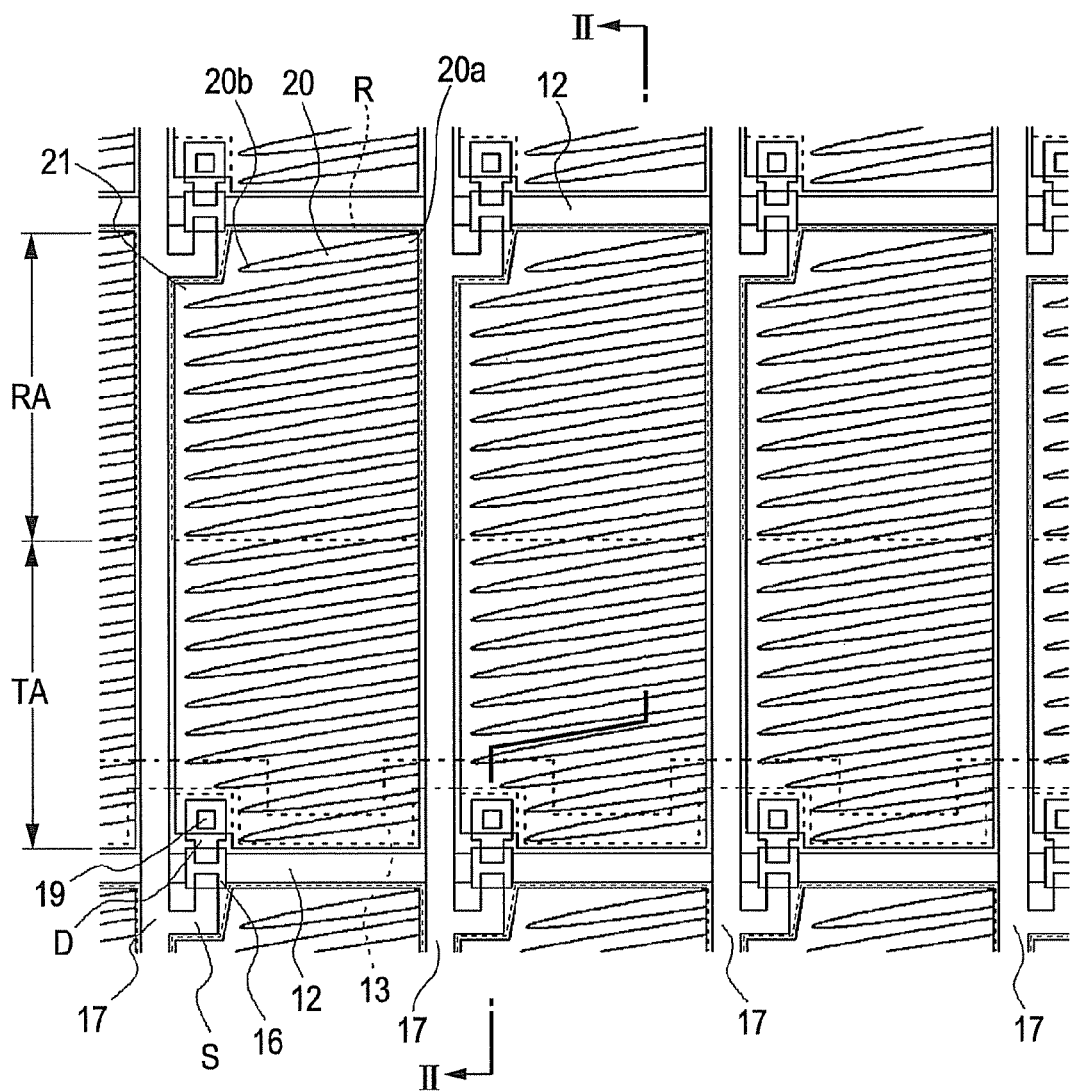
FIG. 1 is a plan view illustrating three of a plurality of pixels included in an FFS-mode transflective liquid crystal display panel according to a first embodiment of the invention, as viewed through a color filter substrate.
Figure 2:
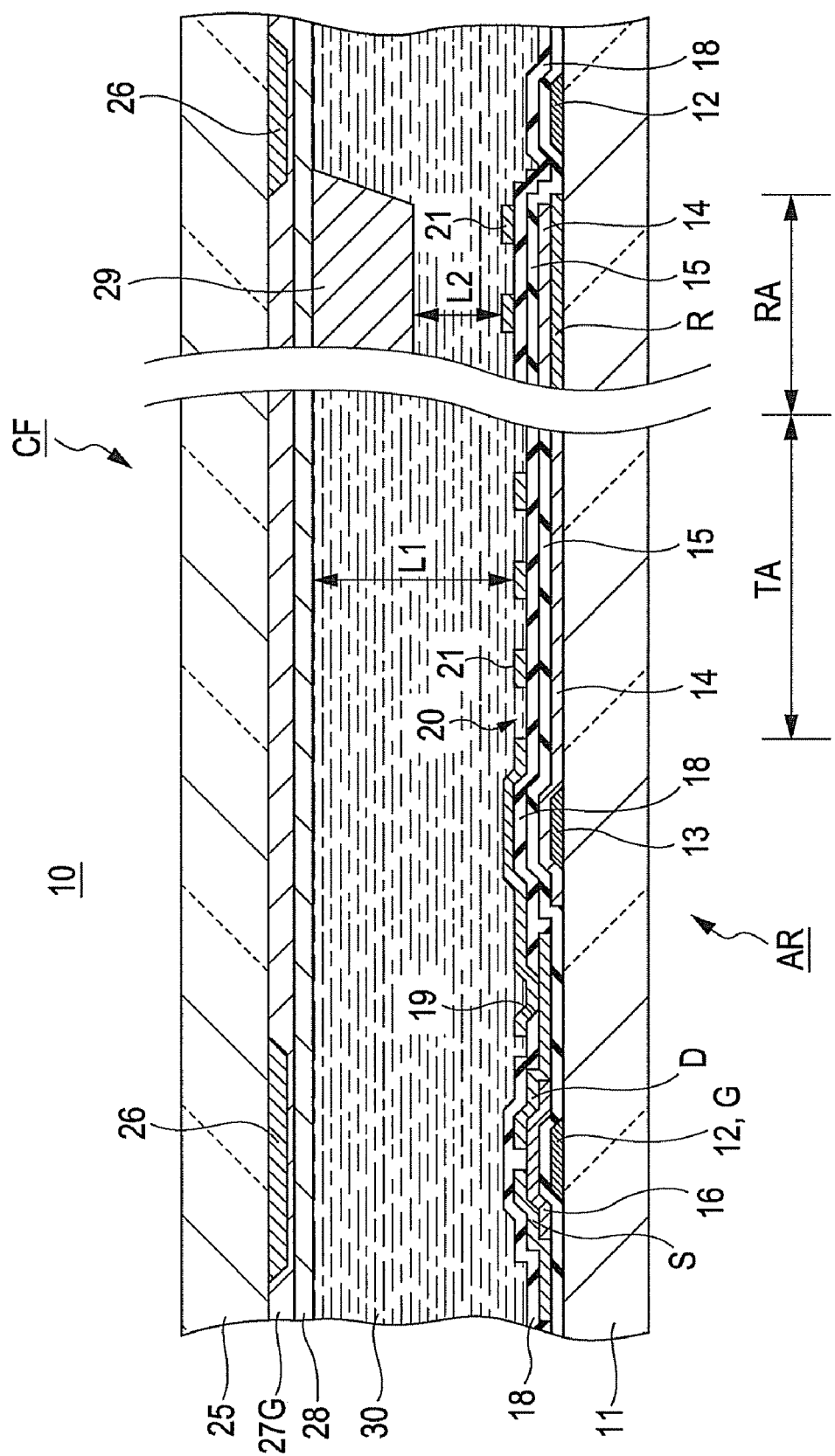
FIG. 2 is a cross-sectional view taken along line II-II in FIG. 1.
Figure 3:
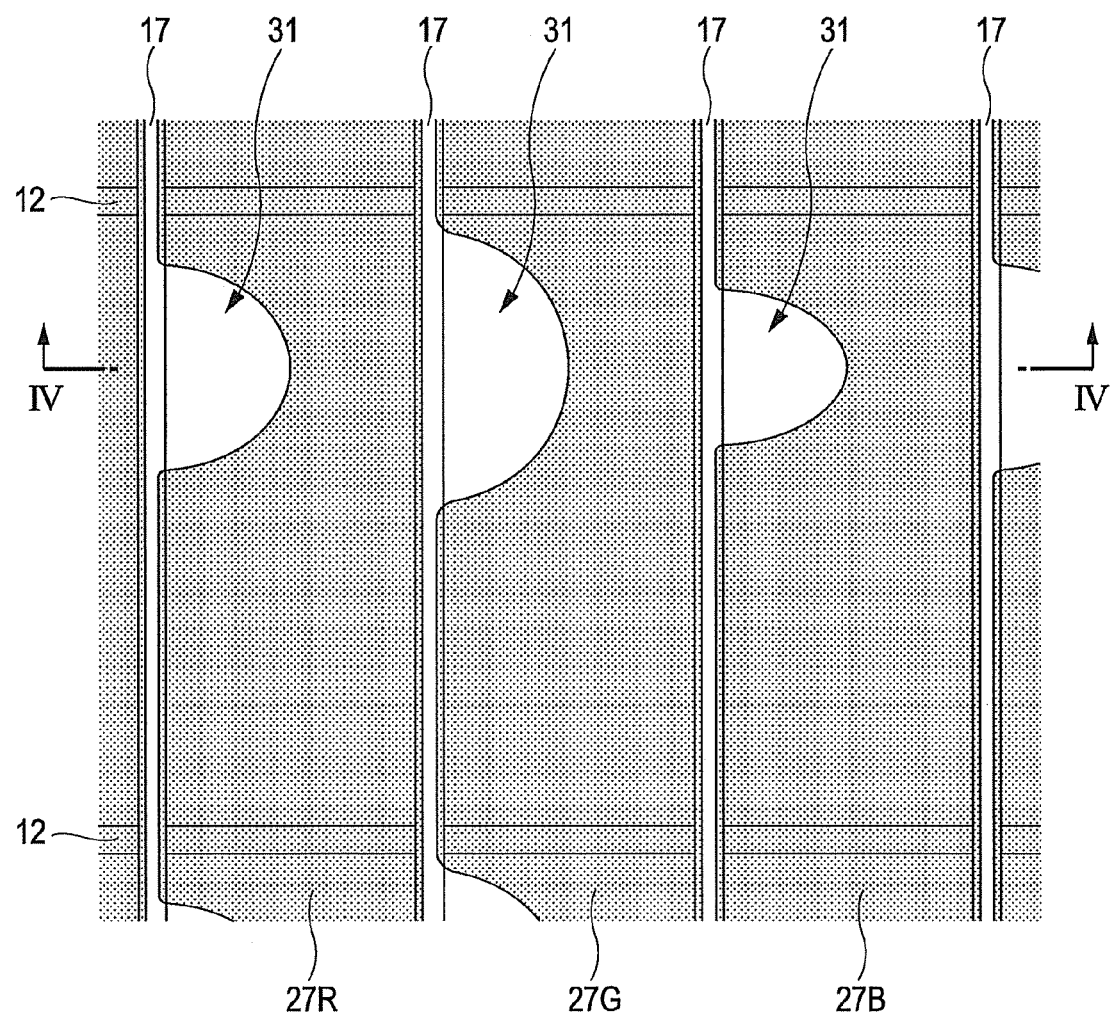
FIG. 3 is a plan view showing a state of color filter layer segments with respect to pixels in an array substrate shown in FIG. 1.
Figure 4:
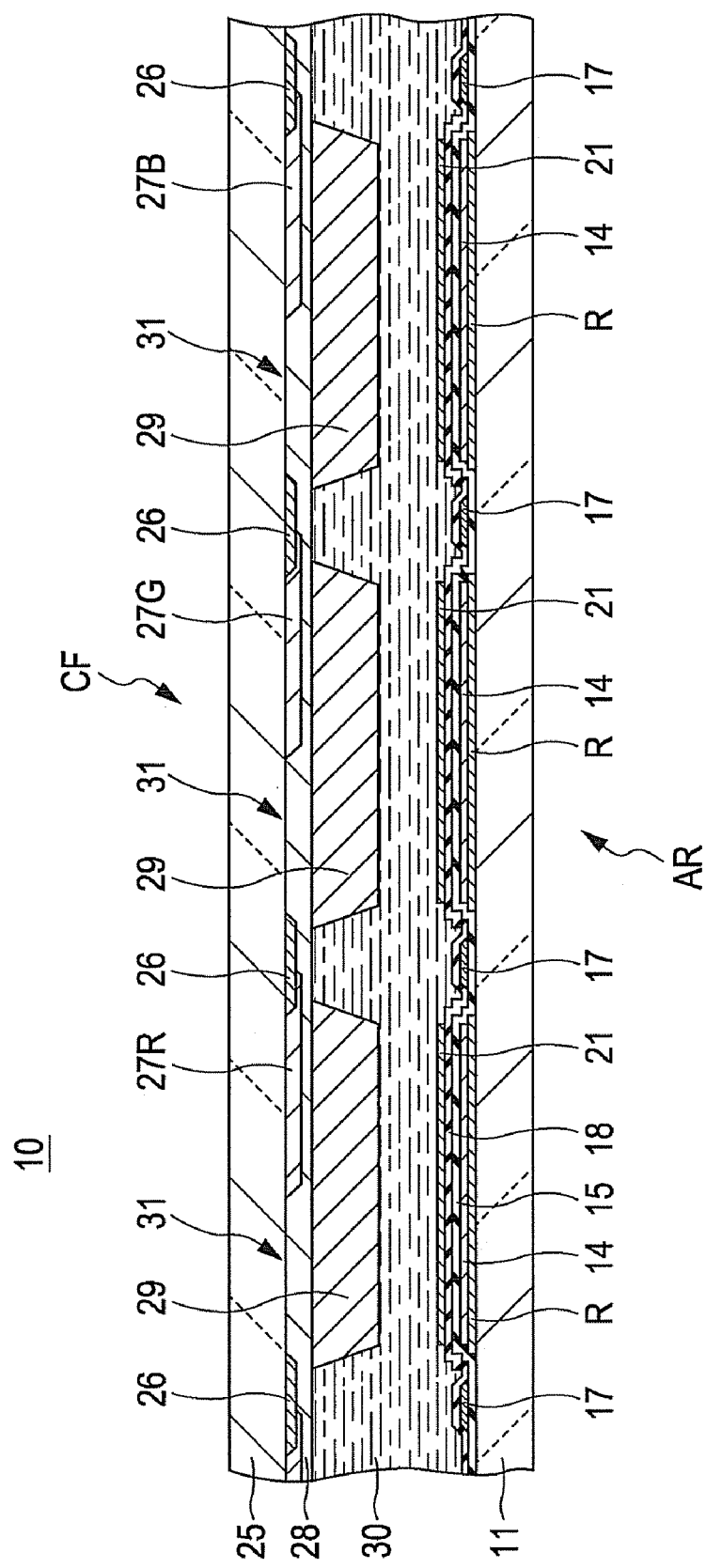
FIG. 4 is a cross-sectional view taken along line IV-IV in FIG. 3.
Figure 6A:
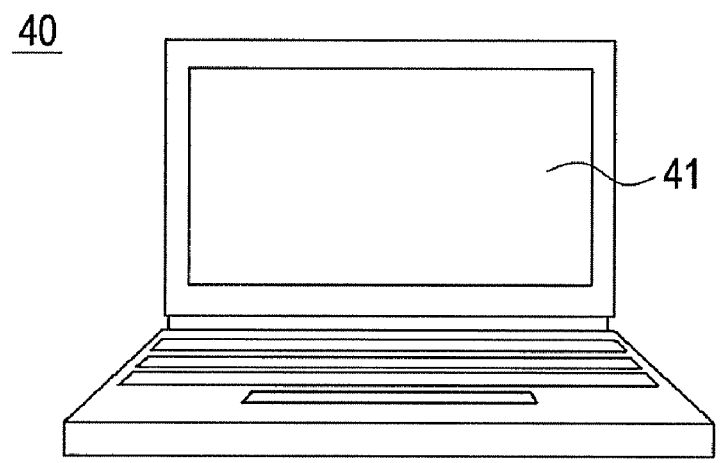
FIG. 6A illustrates a personal computer equipped with the FFS-mode transflective liquid crystal display panel according to the invention.
Figure 6B:
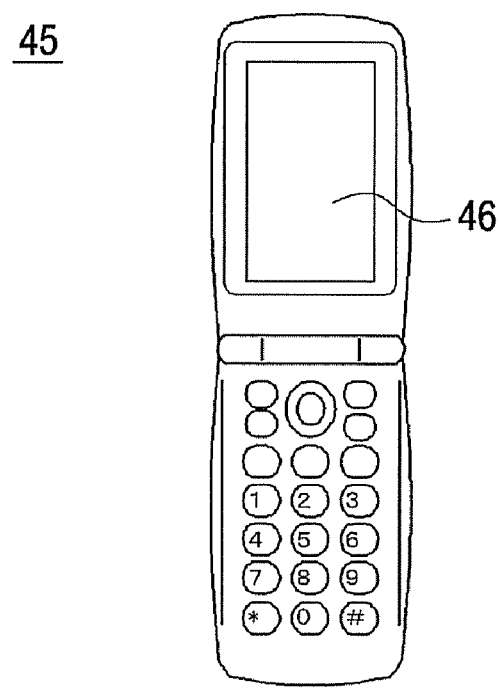
FIG. 6B illustrates a portable telephone equipped with the FFS-mode transflective liquid crystal display panel according to the invention.
Figure 7:
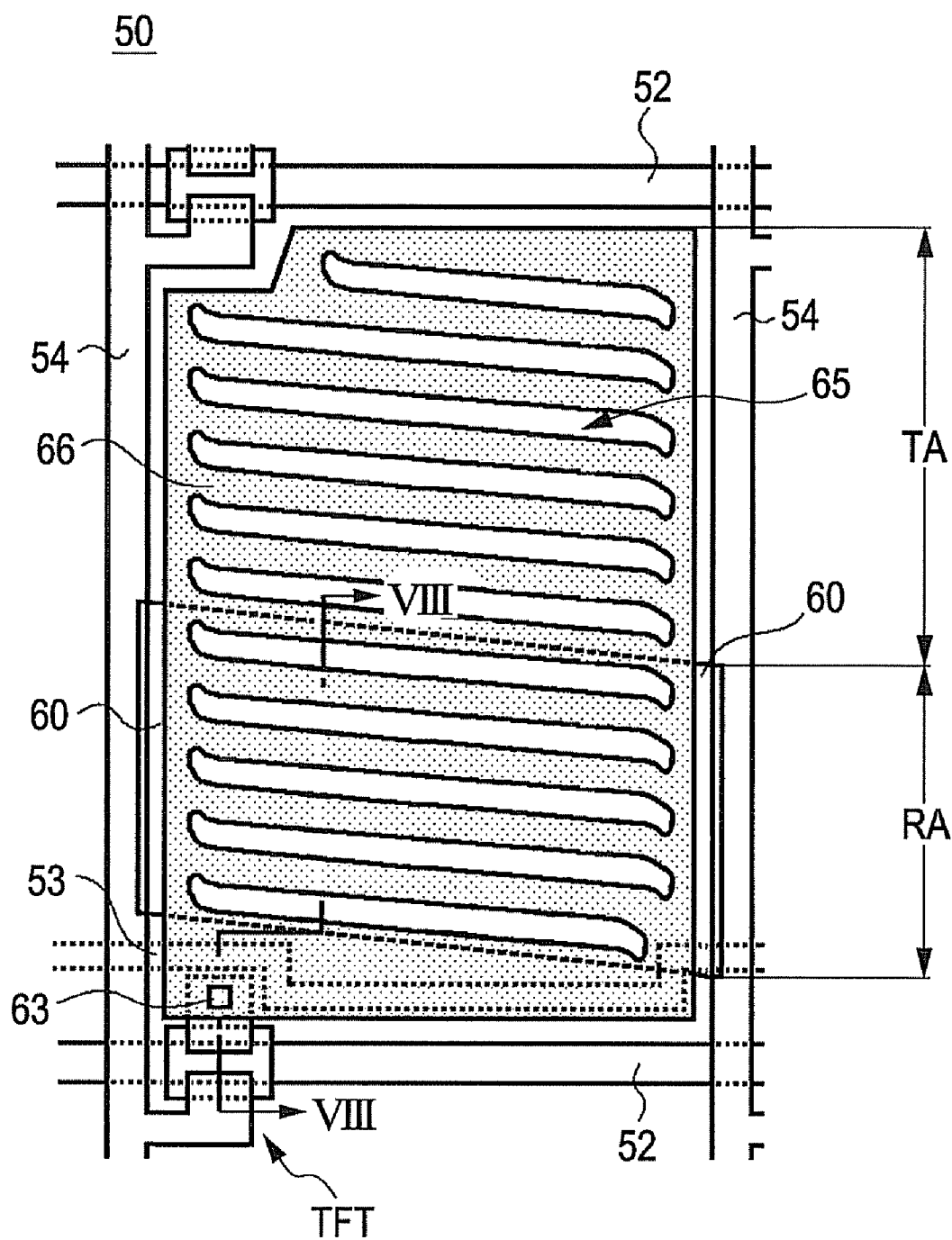
FIG. 7 is a plan view illustrating one of a plurality of pixels included in an FFS-mode transflective liquid crystal display panel of related art.
Figure 8:
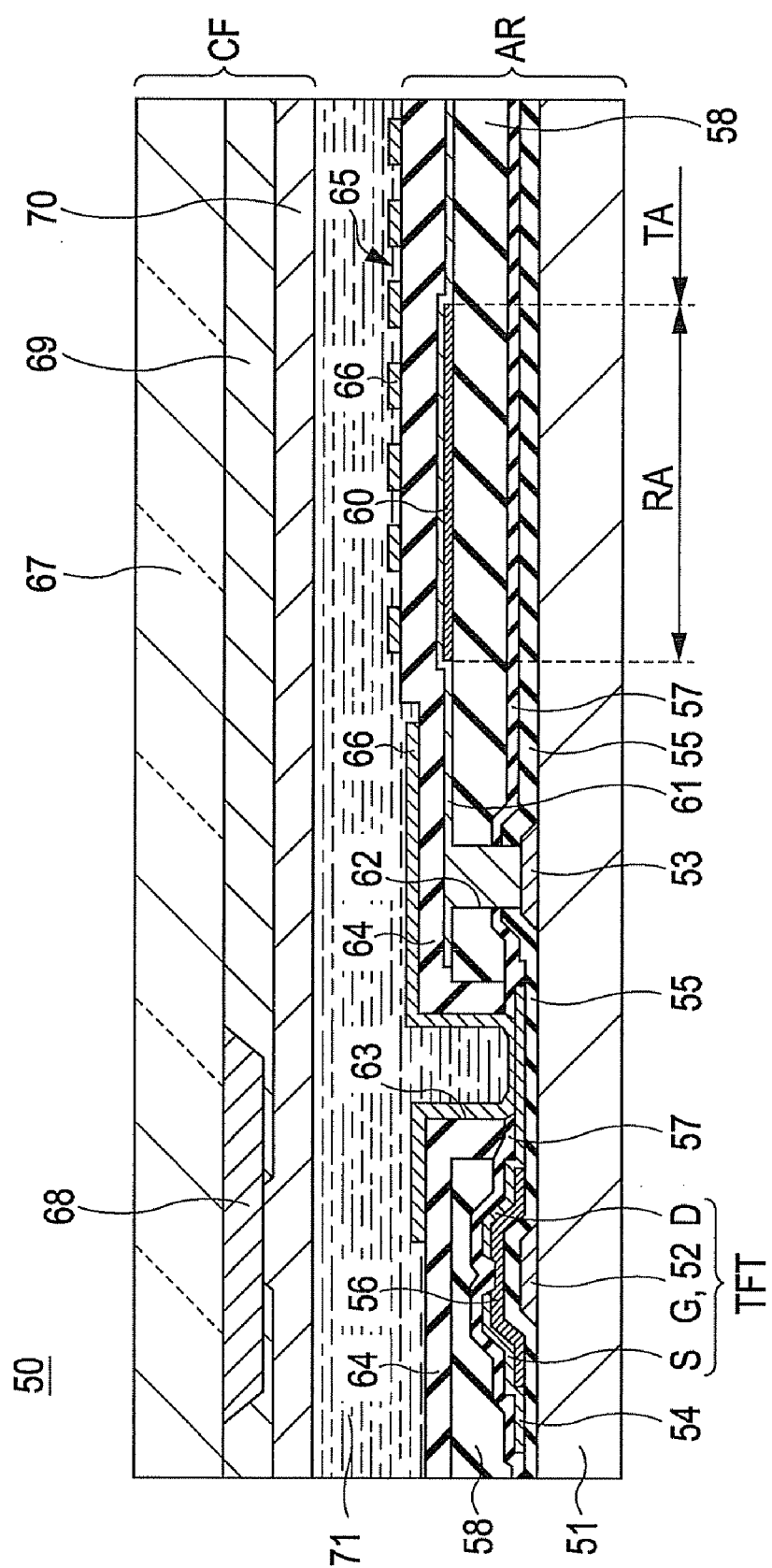
FIG. 8 is a schematic cross-sectional view taken along line VIII-VIII in FIG. 7.

FIG. 1 is a plan view illustrating three of a plurality of pixels included in an FFS-mode transflective liquid crystal display panel according to a first embodiment of the invention, as viewed through a color filter substrate. FIG. 2 is a cross-sectional view taken along line II-II in FIG. 1. FIG. 3 is a plan view showing a state of color filter layer segments with respect to pixels in an array substrate shown in FIG. 1. FIG. 4 is a cross-sectional view taken along line IV-IV in FIG. 3. FIG. 5 is a cross-sectional view of an FFS-mode transflective liquid crystal display panel according to a second embodiment of the invention and corresponds to FIG. 2. FIG. 6A illustrates a personal computer equipped with the FFS-mode transflective liquid crystal display panel according to the invention. FIG. 6B illustrates a portable telephone equipped with the FFS-mode transflective liquid crystal display panel according to the invention.

First Embodiment

An FFS-mode transflective liquid crystal display panel 10 according to a first embodiment will be described with reference to FIGS. 1 and 2. The FFS-mode transflective liquid crystal display panel 10 according to the first embodiment includes an array substrate AR constituted by a transparent substrate 11 composed of, for example, glass and a plurality of scanning lines 12 arranged parallel to each other on the transparent substrate 11. The scanning lines 12 have a double-layer wiring structure of, for example, molybdenum/aluminum (Mo/Al). Along each of these scanning lines 12 is disposed a common wire line 13 made of the same material as the scanning lines 12.

Reflecting plates R composed of aluminum or an aluminum alloy are formed in areas corresponding to reflective sections RA to be described hereinafter. The regions (pixel regions) surrounded by the scanning lines 12 and the common wiring lines 13 are provided with lower electrodes 14 composed of a transparent conductive material such as indium tin oxide (ITO) or indium zinc oxide (IZO). Each lower electrode 14 is disposed over the corresponding common wiring line 13 and the corresponding reflecting plate R. The lower electrodes 14 are electrically connected to the common wiring lines 13 but not to the scanning lines 12 or gate electrodes G, and serve as common electrodes.

The surface of the transparent substrate 11 having thereon the scanning lines 12, the common wiring lines 13, the reflecting plates R, and the lower electrodes 14 is entirely covered with a gate insulating film 15 composed of a transparent insulative material such as silicon nitride or silicon oxide. The gate insulating film 15 has thin-film-transistor (TFT) areas that are covered with semiconductor layer segments 16 composed of, for example, amorphous silicon (referred to as "a-Si" hereinafter). An area of each scanning line 12 where a semiconductor layer segment 16 is formed defines a gate electrode G.

In each pixel region, the gate insulating film 15 also has disposed thereon a drain electrode D and a signal line 17 having a source electrode S. The drain electrode D and the signal line 17 are each defined by a conductive layer having, for example, a three-layer Mo/Al/Mo structure. The source electrode S of the signal line 17 and the drain electrode D in each pixel region both partially overlap the corresponding semiconductor layer segment 16. Furthermore, the entire surface of the transparent substrate 11 is covered with a protective insulating film 18 (also known as a passivation film) composed of a transparent insulative material such as silicon nitride or silicon oxide. In each pixel region, the protective insulating film 18 has a contact hole 19 at a position corresponding to the drain electrode D.

In each pixel region, an upper electrode 21 composed of a transparent conductive material such as ITO or IZO and having a plurality of slits 20 is formed on the corresponding area of the protective insulating film 18 surrounded by the neighboring scanning lines 12 and signal lines 17 so as to form the pattern shown in FIG. 1. The upper electrode 21 is electrically connected to the drain electrode D via the contact hole 19. Thus, the upper electrode 21 serves as a pixel electrode. Furthermore, the entire surface of the transparent substrate 11 is covered with a predetermined alignment film (not shown).

In each pixel region surrounded by the neighboring scanning lines 12 and signal lines 17, the upper electrode 21 having the slits 20 forms a comb-like pattern in plan view, such that one end of each slit 20 adjacent to one of the signal lines 17 is an open end 20a whereas the other end of the slit 20 is a closed end 20b. This increases the aperture at the open end 20a side of the upper electrode 21, thereby allowing for brighter display.

On the other hand, a color filter substrate CF is constituted by a transparent substrate 25 composed of, for example, glass and by a black matrix 26 disposed on the transparent substrate 25 so as to cover areas thereof that correspond to the scanning lines 12, the signal lines 17, and the TFTs on the array substrate AR. Areas of the transparent substrate 25 that are surrounded by the black matrix 26 are provided with color filter layer segments 27R, 27G, 27B (see FIGS. 3 and 4) for three respective colors, which are red (R), green (G), and blue (B) colors. Moreover, the black matrix 26 and the color filter layer segments 27R, 27G, 27B are covered with a protective film 28 composed of, for example, resin. Furthermore, it is preferable that areas of the transparent substrate 25 that correspond to reflective sections RA be disposed thereon transparent resin layer segments 29 for cell gap adjustment. In addition, the entire surface of the transparent substrate 25 is covered with a predetermined alignment film (not shown). According to the transparent resin layer segments 29, the relationship between a substrate-to-substrate distance L1 in transmissive sections TA and a substrate-to-substrate distance L2 in the reflective sections RA is expressed by the following expression (1). The relationship expressed by the expression (1) allows for uniform retardation between the transmission sections TA and the reflective sections RA, thereby eliminating variations in display quality. The transparent resin layer segments 29 are not an essential element of the transflective liquid crystal display panel 10 and may be omitted or substituted by the protective film 28 with an adjusted thickness.

$$L2=(\tfrac{1}{2})L1 \tag{1}$$

The FFS-mode transflective liquid crystal display panel 10 according to the first embodiment is formed by disposing the array substrate AR and the color filter substrate CF opposite to each other in a manner such that the upper electrodes 21 on the array substrate AR and the color filter layer segments 27R, 27G, 27B on the color filter substrate CF face each other, and then sealing a liquid crystal layer 30 between the array substrate AR and the color filter substrate CF.

The color filter layer segments 27R, 27G, 27B formed on the color filter substrate CF will be described below in detail with reference to FIGS. 3 and 4. To provide better understanding of FIG. 3, various wire lines formed on the array substrate AR are not shown except for the scanning lines 12 and the signal lines 17, and the color filter layer segments 27R, 27G, 27B are indicated as shaded areas with a grid pattern.

As shown in FIG. 3, the color filter layer segments 27R, 27G, 27B are arranged in the form of stripes in areas defined by the signal lines 17. The color filter layer segments 27R, 27G, 27B do not necessarily be in such a stripe arrangement, and may alternatively be disposed in, for example, a delta arrangement or mosaic arrangement. Each of the color filter layer segments 27R, 27G, 27B has a window 31 with a predetermined area. Specifically, the window 31 is positioned in an area of the color filter layer segment that corresponds to the reflective section RA and that faces the closed ends 20b of the slits 20 in the corresponding upper electrode 21. Referring to FIG. 4, the windows 31 are filled with the protective film 28 composed of resin in place of the color filter layer segments 27R, 27G, 27B. As an alternative to the protective film 28 embedded in the windows 31, the windows 31 may be filled with, for example, a colorless filter layer.

With these windows 31, a variation in color tone between the display mode using the transmissive sections TA and the display mode using the reflective sections RA can be prevented from occurring. Specifically, when performing a display operation using the reflective sections RA, the external light enters the transflective liquid crystal display panel 10 through the display surface thereof, is reflected by the reflecting plates R, and then exits the display surface. This means that the light passes through the color filter substrate CF twice in total. Supposedly, if the color filter layer segments 27R, 27G, 27B are entirely provided over the reflective sections RA, the color tone under the display mode using the reflective sections RA will be darker compared to that under the display mode using the transmissive sections TA, causing a variation in color tone depending on the display modes. In contrast, with the windows 31 being provided in the reflective sections RA where the color filter layer segments 27R, 27G, 27B are not formed as in the invention, the color tone under the display mode using the reflective sections RA becomes lighter and thus becomes substantially the same as the color tone under the display mode using the transmissive sections TA. Regarding the color filter layer segments 27R, 27G, 27B, since the visibilities of the color components to the user vary, a color filter layer segment for a color with high visibility, such as the color filter layer segment 27G for the green (G) color, is preferably given a window 31 with a relatively large area, whereas a color filter layer segment for a color with low visibility, such as the color filter layer segment 27B for the blue (B) color, is preferably given a window 31 with a relatively small area.

As described above, in the transflective liquid crystal display panel 10 according to the first embodiment, each upper electrode 21 has slits 20 with open ends 20a. These open ends 20a of the slits 20 are susceptible to transverse electric field generated between the nearby scanning line 12 or signal line 17 and a neighboring pixel region, which can lead to an occurrence of light leakage or cross talk. Supposing that the color filter layer segments 27R, 27G, 27B are not provided at positions facing the open ends 20a, the light leakage becomes even greater, which can be problematic in terms of display quality. Consequently, as shown in FIG. 3, the windows 31 in the first embodiment of the invention are provided in areas excluding the positions facing the open ends 20a of the slits 20, such as positions facing the closed ends 20b of the slits 20. With this configuration, even if light leakage does occur at the open ends 20a of the slits 20, the light is colored by the color filter layer segments 27R, 27G, 27B before being emitted from the display screen. This prevents the display quality from deteriorating by a significant degree.

It is preferable that the windows 31 formed in the color filter layer segments 27R, 27G, 27B are each defined by a notch cut out from one edge of the color filter layer segment 27R, 27G, 27B. It is more preferable that the corners of each window 31 are chamfered into a circular arc shape. With the windows 31 being defined by notches cut out from one edge of the color filter layer segments 27R, 27G, 27B, a simplified mask pattern can used for when the color filter layer segments 27R, 27G, 27B are to be formed by, for example, the known photolithography technique. In addition, the chamfered arc-shaped corners of the windows 31 prevent delamination of the color filter layer segments 27R, 27G, 27B in the steps following the step for forming the color filter layer segments 27R, 27G, 27B in a panel manufacturing process.

Second Embodiment

An FFS-mode transflective liquid crystal display panel 10A according to a second embodiment will now be described with reference to FIG. 5. In the transflective liquid crystal display panel 10A according to the second embodiment, the structure of the color filter substrate CF and a part of the structure of the array substrate AR are the same as those in the transflective liquid crystal display panel 10 according to the first embodiment. The components in the transflective liquid crystal display panel 10A according to the second embodiment that are the same as those in the transflective liquid crystal display panel 10 according to the first embodiment are given the same reference numerals, and the descriptions of those components will not be repeated. The following description will only be directed to the array substrate AR having a structure partially different from that in the transflective liquid crystal display panel 10 according to the first embodiment.

The array substrate AR in the transflective liquid crystal display panel 10A according to the second embodiment is constituted by a transparent substrate 11 composed of, for example, glass and a plurality of scanning lines 12 and a plurality of common wire lines 13 arranged parallel to each other on the transparent substrate 11. The surface of the transparent substrate 11 having thereon the scanning lines 12 and the common wire lines 13 is entirely covered with a gate insulating film 15. The gate insulating film 15 has TFT areas that are covered with semiconductor layer segments 16. An area of each scanning line 12 where a semiconductor layer segment 16 is formed defines a gate electrode G.

In each pixel region, the gate insulating film 15 also has disposed thereon a drain electrode D and a signal line 17 having a source electrode S. The drain electrode D and the electrode S in each pixel region both partially overlap the corresponding semiconductor layer segment 16. Furthermore, the entire surface of the transparent substrate 11 is covered with a protective insulating film 18, and the protective insulating film 18 has disposed thereon an interlayer film 33 composed of a transparent insulative material. In the reflective section RA of each pixel, the interlayer film 33 has an uneven surface (not shown). In contrast, in other areas of each pixel including the transmissive section TA, the interlayer film 33 has a flat surface.

The gate insulating film 15, the protective insulating film 18, and the interlayer film 33, which partially cover the common wire lines 13, are provided with contact holes 32. In the reflective section RA of each pixel, the interlayer film 33 has a reflecting plate R disposed thereon. Furthermore, in each pixel, the reflecting plate R and the interlayer film 33 have disposed thereon a lower electrode 14. The lower electrode 14 is electrically connected to the corresponding common wire line 13 via the corresponding contact hole 32. Accordingly, the lower electrode 14 in each pixel serves as a common electrode. In each pixel region, the interlayer film 33 and the protective insulating film 18 have a contact hole 19 at a position corresponding to the drain electrode D, such that the drain electrode D is exposed through the contact hole 19.

Each lower electrode 14 and the interlayer film 33 are covered with a capacitor insulating film 34 composed of a transparent insulative material such as silicon nitride or silicon oxide. The capacitor insulating film 34 covers the wall surface of each contact hole 19 in such a manner that the corresponding drain electrode D is exposed through the contact hole 19. The capacitor insulating film 34 is provided for the adjustment of the distance between the lower electrode 14 and the upper electrode 21 in each pixel region. In each pixel region, the upper electrode 21 having the plurality of slits 20 and forming a comb-like pattern in plan view is disposed on the capacitor insulating film 34. The upper electrode 21 is electrically connected to the drain electrode D via the contact hole 19. Thus, the upper electrode 21 serves as a pixel electrode. Furthermore, the entire surface of the transparent substrate 11 is covered with a predetermined alignment film (not shown).

As described above, an interlayer film is interposed between the protective insulating film 18 and the reflecting plate R and lower electrode 14 of the array substrate AR in each pixel region, so that the lower electrode 14 and the upper electrode 21 can be formed over a larger area. Accordingly, the electric-field generating range in the second embodiment is larger than that in the first embodiment, thereby allowing for brighter display with a higher aperture.

Although the transflective liquid crystal display panel 10A according to the second embodiment described above is directed to an example where the lower electrodes 14 serve as common electrodes and the upper electrodes 21 serve as pixel electrodes, the invention is not limited to such a configuration. For example, an alternative configuration is permissible in which the upper electrodes 21 serve as common electrodes by being connected to the common wire lines 13 and the lower electrodes 14 serve as pixel electrodes by being connected to the drain electrodes D.

As described above, in the transflective liquid crystal display panels 10 and 10A according to the first and second embodiments, a higher aperture is achieved by forming the upper electrodes 21 in a comb-like pattern. Moreover, the windows 31 provided in areas of the color filter layer segments 27R, 27G, 27B that partially face the reflective sections RA allow for uniform color tone. Since each window 31 is formed in an area excluding an area facing the open ends 20a of the slits 20 in the upper electrode 21, the display quality can be prevented from deteriorating due to, for example, light leakage.

The FFS-mode transflective liquid crystal display panels 10 and 10A according to the exemplary embodiments of the invention have been described above. Such an FFS-mode transflective liquid crystal display panel according to the invention can be used in an electronic apparatus, such as a personal computer, a portable telephone, or a personal digital assistant. FIG. 6A illustrates an example where a FFS-mode transflective liquid crystal display panel 41 is used in a personal computer 40. FIG. 6B illustrates an example where a FFS-mode transflective liquid crystal display panel 46 is used in a portable telephone 45. Since the basic configurations of such a personal computer 40 and portable telephone 45 are already known to those skilled in the art, detailed descriptions thereof will be omitted here.

What is claimed is:

1. A transflective liquid crystal display panel comprising:
an array substrate including a plurality of scanning lines and signal lines arranged in a matrix, a lower electrode and an upper electrode in each of pixel regions surrounded by the scanning lines and the signal lines, and a reflecting plate disposed partly below each lower electrode forming a reflective section, the lower electrode and the upper electrode in each pixel region being disposed facing each other with an insulating film therebetween, the lower electrodes being composed of a transparent conductive material, the upper electrodes each having a plurality of slits; and
a color filter substrate including color filter layer segments arranged corresponding to the pixel regions,
wherein the plurality of slits in each upper electrode have first open ends and second closed ends in the reflective section, a width of the slits narrowing in a direction from the first open ends to the second closed ends in the reflective section,
wherein each color filter layer segment for the corresponding pixel region has a window where the color filter layer segment does not exist, the window being located at a position above the corresponding reflecting plate, and
wherein the reflective section includes a plurality of slits each having a first open end facing the color filter layer segment and a second closed end facing the window.

2. The transflective liquid crystal display panel according to claim 1, wherein the windows in the color filter layer segments have different areas from each other in accordance with color components of the color filter layer segments.

3. The transflective liquid crystal display panel according to claim 1, wherein the color filter substrate has transparent resin layer segment for cell gap adjustment, each transparent resin layer segment being located at a position facing a corresponding one of the reflecting plates.

4. The transflective liquid crystal display panel according to claim 1, wherein the array substrate further includes a switching element for each pixel region, and an interlayer film covering the switching elements, and
wherein the reflecting plates and the lower electrodes are disposed on the interlayer film.

5. The transflective liquid crystal display panel according to claim wherein the windows have corners, all of which are curved.

6. An electronic apparatus comprising a transflective liquid crystal display panel according to claim 1.

7. The transflective liquid crystal display panel according to claim 1, wherein the first open ends of the plurality of slits are adjacent to at least one of the signal lines.

8. The transflective liquid crystal display panel according to claim 1, wherein the window is a notch cut out from an edge of the color filter layer segment.

9. The transflective liquid crystal display panel according to claim 8, wherein the window does not face the first open ends of the slits.

10. The transflective liquid crystal display panel according to claim 1, wherein each pixel region includes a transmissive section and the reflective section, and the window is positioned in an area entirely outside of the transmissive section and facing a plurality of the second closed ends of the slits.

\* \* \* \* \*

UNITED STATES PATENT AND TRADEMARK OFFICE
CERTIFICATE OF CORRECTION

PATENT NO. : 8,179,513 B2
APPLICATION NO. : 12/191341
DATED : May 15, 2012
INVENTOR(S) : Kurasawa It is certified that error appears in the above-identified patent and that said Letters Patent is hereby corrected as shown below:

IN THE CLAIMS:

In Claim 5, at column 10, lines 63-64, replace
"5. The transflective liquid crystal display panel according to claim wherein" with
--5. The transflective liquid crystal display panel according to claim 1 wherein--.

Signed and Sealed this
Eighteenth Day of June, 2013

Teresa Stanek Rea
*Acting Director of the United States Patent and Trademark Office*